Nov. 11, 1969  G. W. MISSON  3,477,839
APPARATUS FOR BENDING GLASS SHEETS ON A GAS SUPPORT BED
Filed June 2, 1966  3 Sheets-Sheet 3

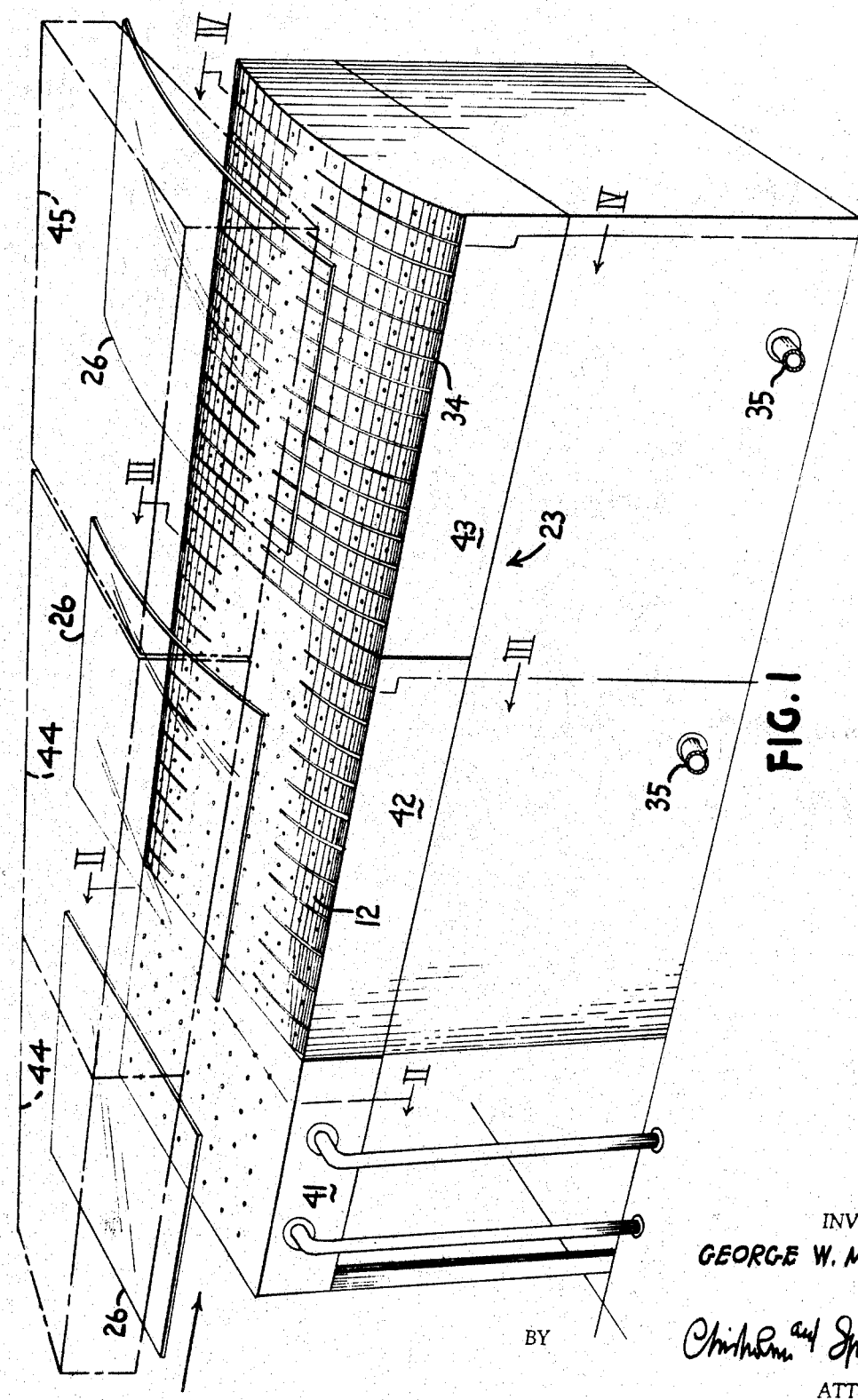

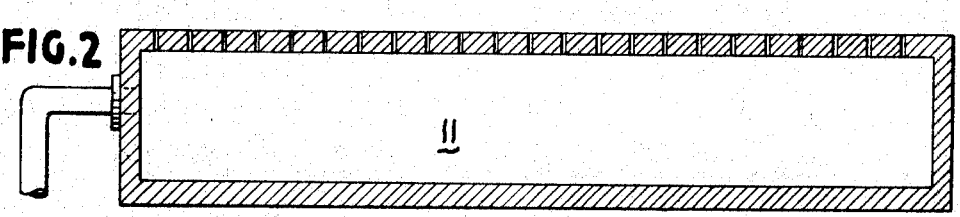
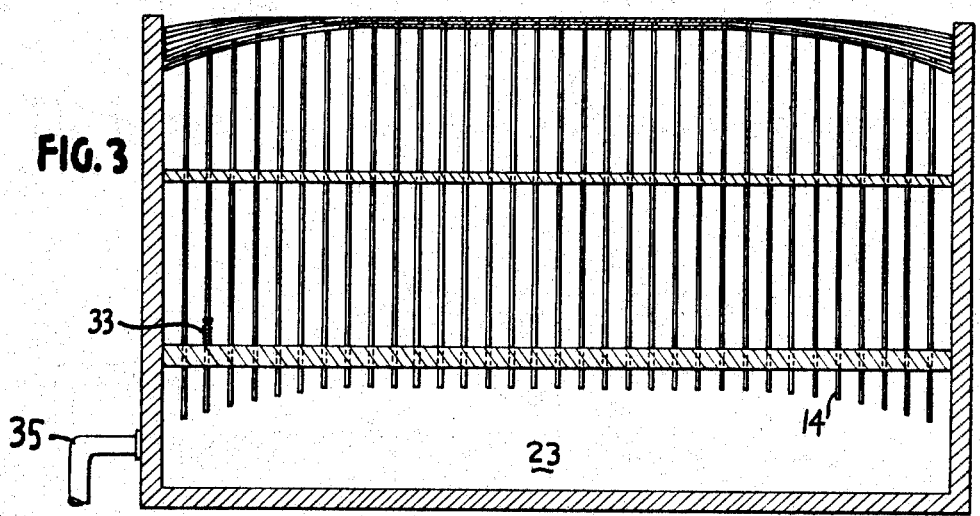
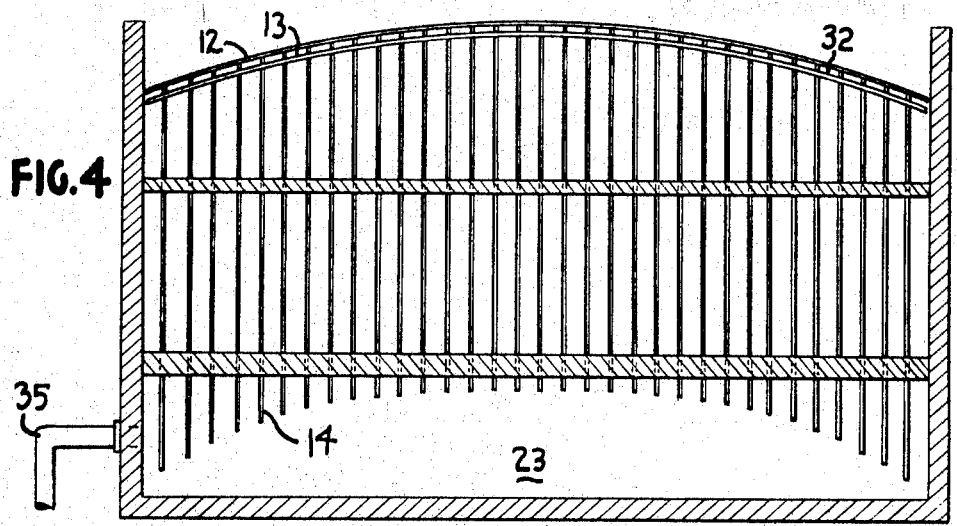

INVENTOR
GEORGE W. MISSON

BY Chisholm & Spencer
ATTORNEYS

United States Patent Office 3,477,839
Patented Nov. 11, 1969

3,477,839
APPARATUS FOR BENDING GLASS SHEETS ON A GAS SUPPORT BED
George W. Misson, Pittsburgh, Pa., assignor to PPG Industries, Inc., Pittsburgh, Pa., a corporation of Pennsylvania
Filed June 2, 1966, Ser. No. 554,707
Int. Cl. C03b 23/02
U.S. Cl. 65—273                                                    5 Claims

ABSTRACT OF THE DISCLOSURE

An apparatus for bending glass sheets which are supported on gas wherein a plenum is provided with a flexible cover plate having gas support outlets, the cover plate being of progressively different flexibility and means are provided for adjusting the curvature at one portion of the cover plate which differs from that of another portion thereof.

---

This invention is designed to provide a method of supporting glass at a temperature above its deformation point without physical contact between the support and the heated glass. Heretofore, glass has been formed while supported by tongs, or by supporting the glass sheet on a bed of fluid and moving the glass over the fluid bed. During the transition of the lass over the bed, the glass may be treated by heating, i.e., annealing, tempering and/or bending. Applicant's invention provides a method of treating glass while supported on air.

Prior art methods of supporting glass on a fluid support bed required an elongated bed, whereon the glass was heated in a heating section, transported over a curved transitional section, and finally allowed to assume the shape of a contoured bed and then ultimately further treated to anneal or temper the glass sheet. Applicant's invention has eliminated the necessity of the elongated fluid support bed and permits complicated curvatures to be induced to plastic glass sheets by changing the contour of the bed from a first contour to a subsequent contour. The apparatus of applicant's invention may be more fully understood by referring to the following drawings and, in conjunction with the following description, a method of and apparatus for bending glass will be fully understood. A preferred use of applicant's process and apparatus may be constructed and practiced by reference to the following specification and accompanying drawings.

In the drawings:

FIG. 1 is a view of a plenum and fluid bed;

FIG. 2 is a fragmentary schematic sectional view of a fluid bed;

FIG. 3 is a sectional schematic view showing details of bed plate construction;

FIG. 4 is a sectional schematic view of the construction of a fluid bed;

Figure 5:
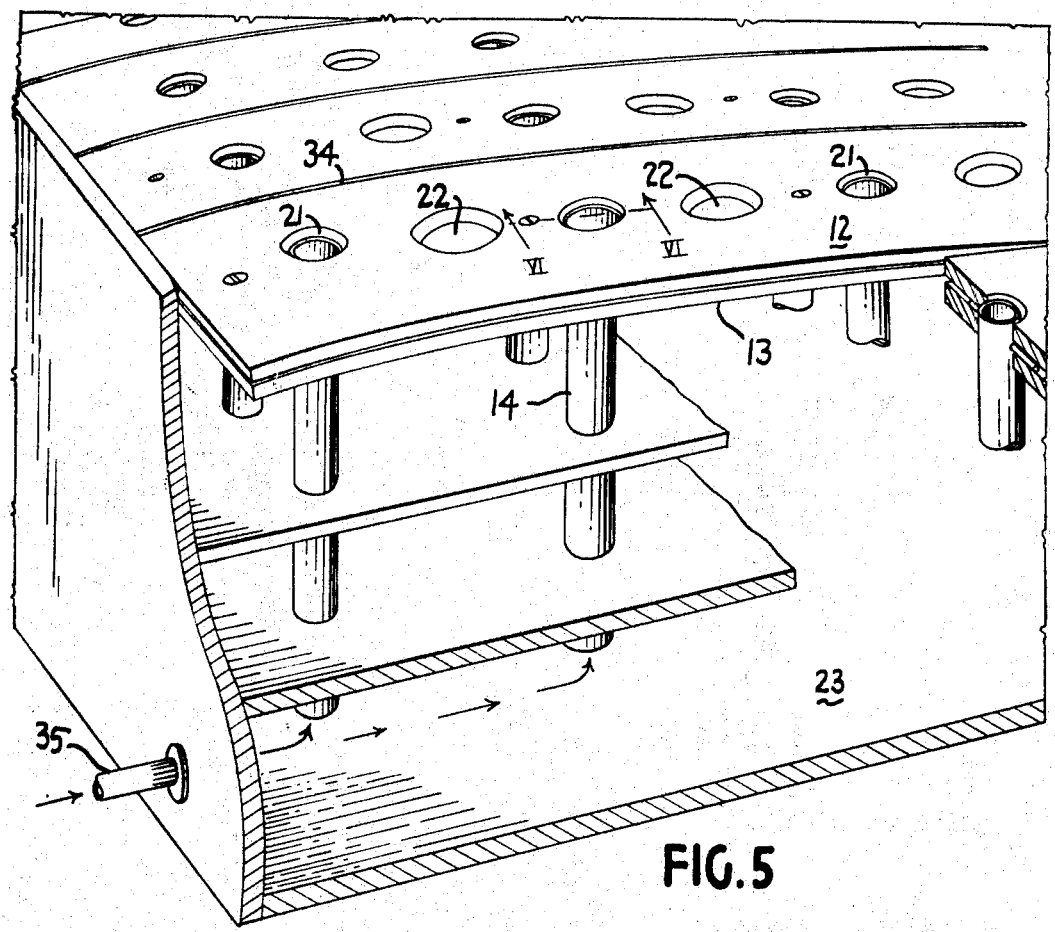
FIG. 5 shows a section of a fluid bed having a porous upper surface.

Referring now to FIG. 1, thereis shown a representative construction of a plenum and associated fluid support bed. A plenum chamber 23 is a basic supporting structure for the apparatus. A series of stems 14 are inserted into the plenum 23. Each stem has a stem pivot 20. An upper bed plate 12 and a lower bed plate 13 constitute a bed. These plates are flexibly constructed so they can be made to conform to desired radii of curvature. Each bed plate, both upper and lower, has numerous circular apertures 22. The bed plates are attached to each other by a clip 11. The clip serves to maintain a spaced relationship between the plates and also permits the plates to be "flexed" to a desired radius of curvature. A stem 14 serves two functions: as a conduit for providing the gaseous supporting film, and as a regulating means by which the curvature of the plates may be adjusted and then rapidly positioned. A series of stems is positioned in and through the circular holes in the flexible plates in such a manner that the upper-most end of each stem is located just below the upper surface of the plate. This arrangement may be clearly seen in FIG. 4. This positioning is maintained by means of stem pins 20 fixed to the stem 14, said pins establishing and maintaining appropriate spacing requirement. The pin also provides a pressure point to provide for adjustable positioning of the bed by adjusting the height of the stems across the width of the bed. This arrangement is illustrated fully in FIG. 5.

In order that the stems may be accommodated in the upper plate, the upper plate holes are slightly larger in diameter than the corresponding stem. The larger diameter allows for greater horizontal displacement of the stem. The lower end of each stem will pass through a restricted sealing opening 24 positioned in an upper surface of a plenum chamber. This arrangement is illustrated in FIG. 5. The stem is connected to the plenum's upper surface. The sealing gland provides a slip joint to allow the stem to be raised or lowered to produce any desired bed curvature. Naturally, the length of the stem is determined by the depth of the plenum. However, it is apparent that the limitations of bending glass will not require a plenum of great depth.

A plenum can be supplied with hot, combustible gases and cool gases, both under pressure.

In operation, the fluid travels through the conduit 15 in a stem 14 from the plenum to the opening in the top of the stem and the fluid is discharged and impinging on the supporting surface of a glass article 26; a proper fluid pressure will support said glass article and contribute to whatever process, i.e., heating or cooling, is desired.

In operation, portions of the fluid will escape through the clearance space between the stem and the upper and lower flexible plates. These exhaust areas are illustrated in FIG. 4 by numeral 32. Additional discharge portions may be provided in both plates, between and around the apertures accommodating the stems.

FIG. 3 shows an alternate spring-loaded supporting mechanism. A spring 33 is encircled about the stem 14 to provide a constant supporting and spacing pressure to the bed plates.

FIG. 5 shows a perspective view of a bed plate arrangement. A cut-out portion 34 is provided in the transition section to facilitate flexing of the plates. An air supply 35 and a vent 32 are provided in the bed plates. The air supply and the vent alternate in geometric positioning.

Figures 6, 7:
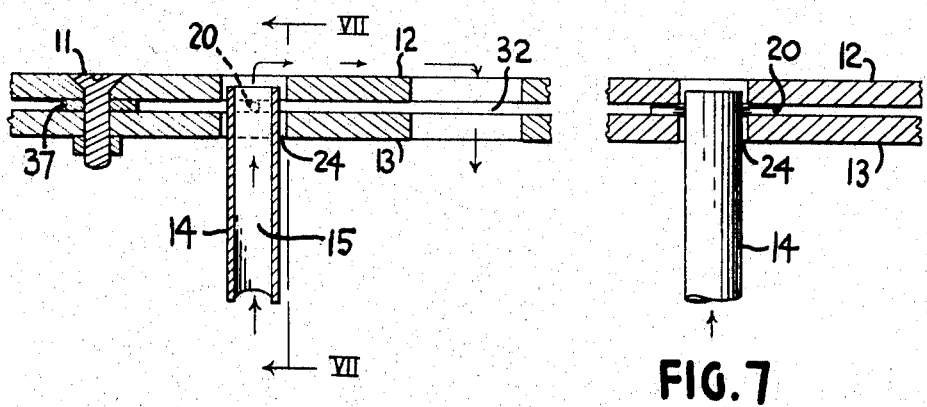
FIG. 6 is a cross section view of a bed plate construction.
FIG. 7 is a sectional schematic view of the bed plate of FIG. 6.

FIG. 6 is a detailed schematic view showing an upper and lower bed plate and plate spacer 37.

The portion of the hearth upstream of the glass travel is known as the constant radius section of the processing line. Downstream, slits cut-out portions are cut in from the edge of the plate to provide for a variable radius section of the processing line. The slits 34 in the bed plates provide that the bed plates may be changed in gradual incremented change from a flat to a curved surface. This is illustrated in FIGURES 1 and 3. As the sheet of glass 26 progresses downstream along the hearth bed, there is a gradual transition from the flat plate, as illustrated in the first part of the hearth, and a curved sheet, which is shown at the downstream end of the hearth. The position of the upper plates can be adjusted by any suitable means, such as spring loading, or by a hydraulic system of jacks, or other elevating mechanism to change the curvature thereof. The elevating mechanism can be static once it is set or can be controlled as the glass moves downward. This control system is not part of the invention, and any standard method could be utilized for this purpose. Hot gas is applied to the section designated 41 in FIG. 1. Cool gases may be applied to the section designated 12 in FIG. 1 for either sudden quenching to produce a temper or slow cooling to anneal. A basic method of treating a glass sheet on an air support is described in U.S. Patent 3,223,501, issued Dec. 19, 1965 to Fredley, et al.

The method of floating a sheet of glass on a hot gas or a cool gas supporting bed is described therein, and hence a complete description of that operation is not believed necessary to the practice of this invention.

In operation, a sheet of glass 26 is run onto bed section 41 and gas at or above a gas deformation temperature is supplied to the plenum chamber and passes through the conduits to the top of the bed and heats the glass to deformation temperature or above.

The heat softened deformable glass is then passed onto the variable radius section of the hearth 41 and 42 and the mechanism for adjusting the curvature of the hearth is operated, causing the bed 12 to assume a radius transverse to the longitudinal direction.

In other contemplated embodiments of this invention, hot gas may be supplied to heat section 42 of the plenum to keep the glass in a plastic condition. The glass is subsequently run onto quench bed 43 where cooling air is supplied to the bed for tempering, annealing and other operations. In other embodiments, the hot gas in section 43 may be substituted by cooling gases for tempering.

Glass sheet 26 may be oscillated over the bed 41 to increase the heat supplied to the glass by increasing the time exposure to the heat. The same oscillatory motion may be performed over the cooling bed to increase the time exposure to the cooling gas and yet reduce the length of the heating or cooling apparatus.

Additional heat sources and cooling sources supply a counter-balancing heat and/or cooling gas to the upper surface of the glass to provide a uniform heating and/or cooling rate throughout the operation.

Various embodiments of the disclosure herein are contemplated without departing from the invention as claimed in the claims.

What is claimed is:

1. An apparatus for bending glass sheets at the deformation temperature of said glass while said sheets are supported on a gas support comprising:
    (a) a plenum having side walls and a bottom wall;
    (b) a flexible plate member forming an upper surface for said plenum, said plate member having (1) side edges mounted for relative movement with respect to the inner faces of the side walls of said plenum; and (2) inlet and outlet vents interspaced throughout the surface thereof forming the upper surface of said plenum;
    (c) hollow gas conduits connected to said flexible plate member, one end of each of said conduits being connected to an inlet vent in said plate, the other end of each of said conduits slidably extending through the bottom wall of said plenum;
    (d) means for supplying gas to said conduits; and
    (e) means to adjustably position said slidable conduits in relation to the bottom wall of said plenum whereby the curvature of said flexible plate member is adjusted.

2. An apparatus as set forth in claim 1, wherein said flexible plate member comprises a spaced, juxtaposed pair of upper and lower plates, means interconnecting said upper and lower plates for maintaining said plates in spaced relation, said upper and lower plates having aligned inlet and outlet vents throughout the surface of each said plate.

3. An apparatus as set forth in claim 2, wherein the end of each of a plurality of said hollow gas conduits extending into said inlet openings have laterally extending pivot means positioned between said spaced plates for pivotally connecting said last named gas conduits to said flexible plate member.

4. An apparatus as set forth in claim 1, wherein said flexible plate member is provided with cut-out portions forming a plurality of spaced slots extending inwardly from a side edge of said flexible plate member transversely with respect to the direction of movement of the hot glass sheets over said flexible plate member.

5. An apparatus as set forth in claim 4, wherein said cut-out portions in certain regions of said flexible plate member extend inwardly from the side edge thereof a greater distance than the cut-out portions in other regions of said flexible plate member whereby said flexible plate member is more flexible in said first named region than in said second named region.

References Cited

UNITED STATES PATENTS 3,223,501    12/1965    Fredley et al.
3,367,764    2/1968    Seymour _____ 65—273 X S. LEON BASHORE, Primary Examiner ARTHUR D. KELLOGG, Assistant Examiner U.S. Cl. X.R.
65—107, 287; 214—1